Oct. 15, 1968  W. PETERS ET AL  3,405,508
METHOD AND APPARATUS FOR PURIFYING GASES
Filed Oct. 10, 1966  2 Sheets-Sheet 1
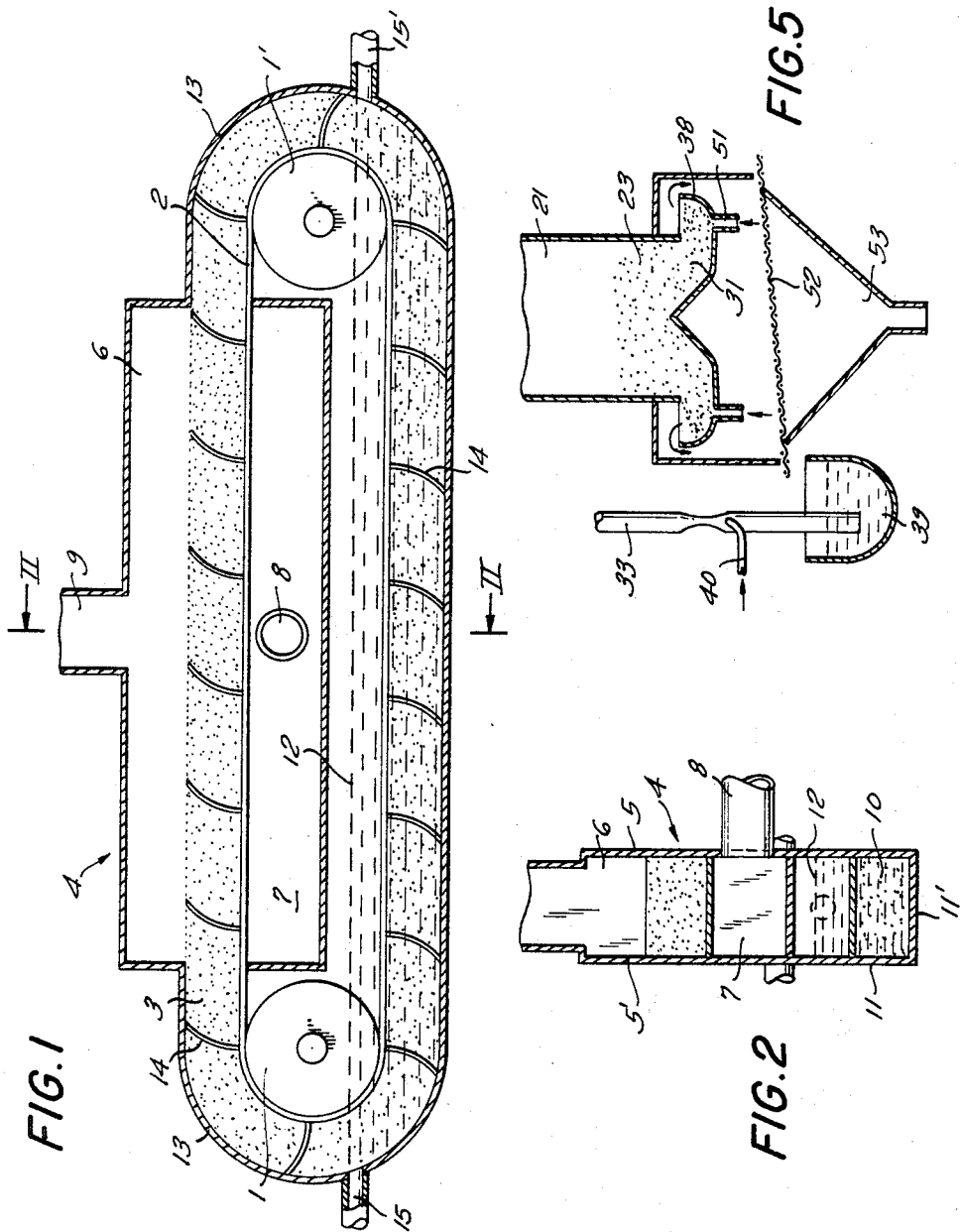
INVENTORS
Werner Peters
Harald Jüntgens
Michael S. Striker
ATTORNEY

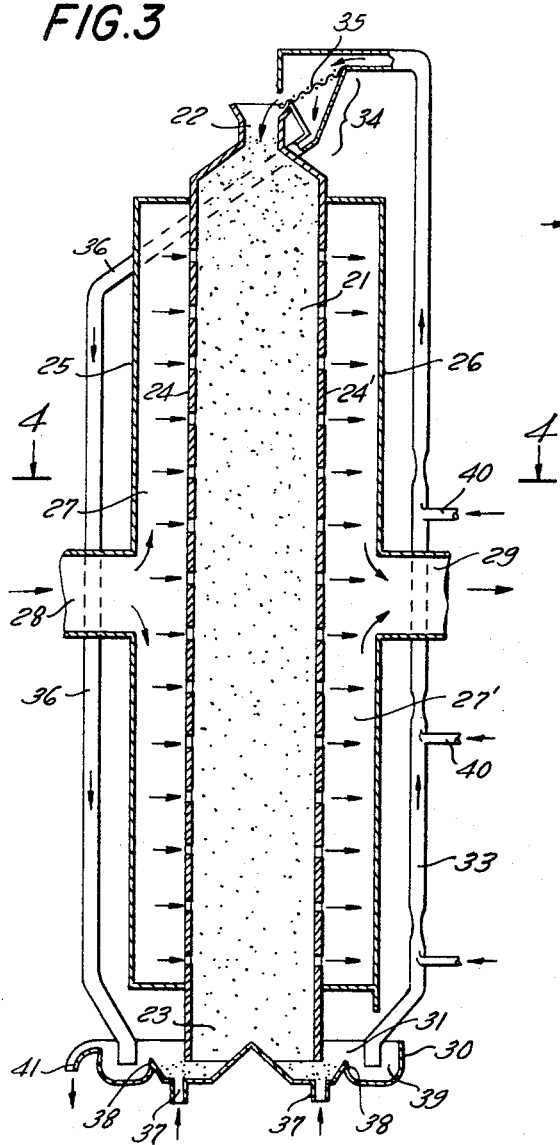
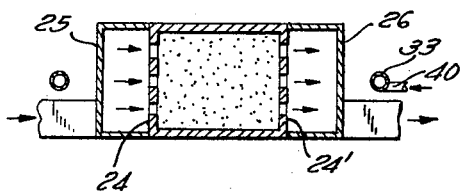
FIG.3
FIG.4

United States Patent Office 3,405,508
Patented Oct. 15, 1968

3,405,508
METHOD AND APPARATUS FOR
PURIFYING GASES
Werner Peters, Wattenscheid, and Harald Juntgen, Essen-Heisingen, Germany, assignors to Firma Bergwerksverband G.m.b.H., Essen, Germany
Filed Oct. 10, 1966, Ser. No. 585,570
Claims priority, application Germany, Oct. 8, 1965,
84,027
23 Claims. (Cl. 55—73)

ABSTRACT OF THE DISCLOSURE

Sulfur oxides are removed from gases such as industrial waste gases by passing the gases in a contact zone through a moving layer of particulate adsorption material. The charged moving layer is introduced downstream of the contact zone into an aqueous desorption liquid to remove the adsorbed sulfur oxides. The desorption liquid dissolves the adsorbed sulfur oxides and prevents escape of free gas from the adsorption material.

---

The present invention relates to a method and apparatus for purifying gases and, more particularly, the present invention is concerned with the purification of industrial waste gases, derived for instance from the operation of steam boilers and the like and containing oxides of sulfur as impurities which should be removed there from.

Oxides of sulfur may be removed from such gases by adsorption on activated carbon. The activated carbon which has been charged with sulfur oxides is then regenerated either by desorbing the sulfuric acid formed in the pores of the activated carbon by heating of the carbon to between 250 and 350° C., or by washing the charged activated carbon with water or aqueous solutions so that, irrespective of which method of regeneration has been employed, the thus regenerated adsorbing material may be reused for purification of subsequent portions of sulfur oxides or the like-containing gases.

When it is desired to regenerate the adsorbing material by a dry method, it has been suggested to use as the adsorbing material a moving layer of particulate activated carbon or the like. Preferably, the waste gases are so directed as to pass through the moving layer of adsorbing material in a direction substantially perpendicular to the direction of movement of the moving layer since, in this manner, the speed of flow of the gas through the moving adsorbing layer may be kept relatively slow and thus a relatively small loss of pressure will occur in the gas during passage of the same through the layer of adsorbing material. Furthermore, it is possible by proceeding in this manner to keep the thickness of the layer through which the gas passes, or the distance for which the gas has to pass through the adsorbing layer relatively small. Notwithstanding the fact that the volume of gas which has to be purified during a given period of time generally is very large, it is possible by passing the gases in a direction perpendicular to the direction of movement of the moving layer through the same, to satisfactorily purify in a single device a very large volume of gas. Conventional devices are operated generally in such a manner that the adsorbing material passes in an inclined direction or vertically downwardly, forming a moving layer and is withdrawn at the lower end of the device by means of a suitable sluicing arrangement which will substantially prevent the escape of gas together with the withdrawn particulate adsorbing material, while at the same time the gas passes through the downwardly moving layer in a direction transverse to the direction of movement of the layer of particulate adsorbing material.

The withdrawn adsorbing material which has been charged with the impurities adsorbed from the gas is then regenerated in an independent device, for instance by treating the charged adsorbing material with hot gases.

However, to proceed in this manner has several disadvantages. Due to the necessity of sluicing the particulate mass out of the lower portion of the gas adsorbing device, in order to prevent the escape of substantial quantities of the gas which is being treated together with the withdrawn spent or charged adsorbing material, and the required charging of a second reactor with the spent adsorbing material for the purpose of regenerating the same, followed by transporting the regenerated adsorbing material to the top portion of the gas purifying device, considerable abrasion of the relatively expensive adsorbing material will occur and will increase the costs of the process. Furthermore, it is difficult and involved to cool the adsorbing material after it has been regenerated so that upon being reintroduced at the head of the gas purifying device, the adsorbing material will have a temperature sufficiently low to permit adsorption of the impurities such as sulfur oxides. At too highly elevated temperatures, the danger exists that the adsorbing material might be ignited, since the waste gases from boiler operations or the like sometimes contain up to 10% of oxygen. Furthermore, the thermal regeneration of the adsorbing materail is connected with the disadvantage that by reacting the bound sulfur dioxide with carbon of the adsorbing material a continuous consumption of the activated carbon takes place which initially will increase the adsorptive capacity of the carbon but eventually leads to considerable losses with respect to the hardness and abrasion resistance of the adsorbing material so that the same has to be renewed prematurely.

The other possibility, namely wet regeneration of the adsorbing material has been carried up to now either by continuously spraying water onto the adsorbing material during the adsorption process, or by subjecting the spent adsorbing material to a special washing process. Since in both cases the adsorbing material is used as a stationary layer, the problem of abrasion losses will not occur, however, other disadvantages are connected with the last-described process, for instance the very slow speed of adsorption due to continuous rinsing with water, or the difficulties involved in operating in a discontinuous manner by following charging of the adsorbing material with a regenerating washing of the same. Furthermore, the adsorption of impurities from waste gases or the like on a stationary layer is connected with the disadvantage that the layer will eventually be plugged by deposition of dust particles in the interstices thereof and it is therefore necessary to subject dust-containing waste gases to a pretreatment, for instance by passing the same through an electrostatic filtering device, to separate dust therefrom prior to introducing of the thus pretreated waste gases into the adsorbing device.

It is therefore an object of the present invention to overcome the above-discussed difficulties and disadvantages.

It is a further object of the present invention to provide a method and apparatus for the continuous purification of gases, particularly of gases of the type described, which can be carried out in a simple and economical manner.

It is yet another object of the present invention to provide a method and apparatus for the continuous purification of gases by passage of the same through a moving layer of adsorbing material, whereby abrasion and dust formation is substantially reduced.

Other objects and advantages of the present invention will become apparent from a further reading of the description and of the appended claims.

With the above and other objects in view, the present invention contemplates a method of separating adsorbable constituents from a gas containing the same, comprising the steps of passing the gas through a moving layer consisting essentially of a particulate mass of adsorbing material capable of adsorbing the adsorbable constituents, while moving the layer from a first to a second location, so as to substantially free the gas of the adsorbable constituents thereof by contact of the gas with the layer while the same moves between the two positions thereby simultaneously charging the moving layer with adsorbable material, introducing the thus charged moving layer in the region and downstream of the second location into a desorption liquid capable of dissolving the adsorbable material and thereby to separate the same from the particulate mass, so as to form a mixture comprising thus desorbed particulate mass and a solution of the adsorbable constituents in the desorption liquid, passing the mixture to a point in the region of the first location, substantially separating the mixture in the region into separated solution and desorbed particulate mass, and reintroducing the thus separated desorbed particulate mass in the region of the first location into the moving layer for desorbing subsequent portions of the gas during subsequent movement of the layer towards the second location.

Preferably the gas will pass through the moving layer in a direction substantially perpendicular to the direction of movement of the moving layer.

According to certain embodiments of the present method, the layer moves from the first to the second location in a substantially horizontal direction, whereas in accordance with other embodiments of the present invention, the layer moves from the first to the second location in a downwardly inclined or preferably substantially vertical direction.

It is also preferred, in accordance with the present invention to remove dust-like particles from the particulate adsorbing mass prior to introduction of the latter into the desorption liquid.

The present invention is also concerned with an apparatus for separating adsorbable constituents from a gas containing the same, the apparatus comprising, in combination, guide means for guiding a layer of particulate adsorbing material from a first location to a second location spaced from the first location, gas conveying means for passing gas containing adsorbable constituents through the layer while the same moves between the first and second location, immersion means cooperating with the guide means in the region of and downstream of the second location for immersing the layer of particulate adsorbing material in a desorption liquid thereby forming a mixture of the adsorbing material of the layer and the desorption liquid and causing dissolution in the desorption liquid of constituents of the gas which had been adsorbed by the particulate absorbent material of the layer during movement of the latter from the first to the second location, conveying means for passing the mixture from the region of the second location into the region of the first location, separating means associated with the conveying means in the region of the first location for separating thus desorbed particulate adsorbent material from the solution, and introducing means cooperating with the separating means and the guiding means for introducing thus separated particulate adsorbing material into the guiding means in the region of the first location to serve as subsequent portions of the moving layer.

The disadvantages of prior art arrangements and methods which were described further above are overcome according to the present invention according to which the regeneration or desorption of the charged or spent adsorbing material is carried out by a wet method. According to the present invention, the purification of the gas is carried out by contact of the same with a moving layer of adsorbing material. However, the moving layer does not terminate its movement in a mechanically operated sluicing arrangement but, to the contrary, by being introduced into a liquid bath which not only forms a seal substantially preventing the escape of gas which is to be treated but which also serves as regenerating liquid for the adsorbing material. The adsorbing material is then passed suspended in the regenerating or desorption liquid to the region of introduction of the absorbing material into the gas purification device, separated from the liquid and then directly introduced into the gas purification device to form subsequent portions of the moving layer of adsorbing material therein. Suitable desorption liquids include primarily water which, however, may include substances capable of binding the impurities of the gas which upon regeneration of the charged adsorbing material became dissolved in the desorbing liquid. For instance, it has been found advantageous to use an aqueous solution of ammonia for desorbing $SO_3$ from the spent adsorbing material.

It is a particular advantage of the method of the present invention that it permits to transport the particulate adsorbing material substantially without friction to the part of the gas purification device where the transported adsorbing material is to form the moving layer for contacting subsequent portions of gas which is to be purified. This is achieved by transporting the pulverulent adsorbing material as a suspension in the desorbing liquid. Furthermore, the desorbing effect of the liquid will be improved if the same is passed in countercurrent to the adsorbing material being immersed in the liquid upon leaving the adsorbing stage of the device, and by circulating the liquid first as the continuous phase of the suspension to the region of the gas purification device where the downwardly moving layer of particulate material is to be formed, and from there—after separation of the particulate material therefrom—back into the region where spent adsorbing material is to be contacted by the desorption liquid. By suitably introducing fresh desorption solution and withdrawing spent solution, it is possible to maintain a relatively high concentration of dissolved gaseous impurities in the circulating liquid so that it becomes more economical to work up the withdrawn portion of the solution for recovery of the impurities or of compounds formed of the impurities and constituents of the desorbing liquid.

The period for which the particulate material has to be in contact with the desorbing liquid in order to achieve the desired degree of desorption, is easily controlled by suitably arranging the volume or cross section of the containers or conduits through which the suspension of adsorbing material in desorbing liquid has to pass.

In the case of dust-containing waste gases, sometimes certain problems arise inasmuch as a portion of the dust might be dissolved in the adsorption liquid and thereby the quality of products recovered from the spent desorbing liquid may be impaired. In this case, it is sometimes desirable, as will be described in detail further below, to separate the particulate spent adsorbing material from dust-like constituents thereof prior to contacting the particulate material with the desorption liquid. Such separation may be carried out by suitable screening or blowing processes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic elevational view, partially in cross section, of an embodiment of the apparatus of the present invention;

FIG. 2 is a cross sectional view taken along line II—II of FIG. 1;

FIG. 3 is a schematic elevational view partially in cross section of another embodiment of the apparatus according to the present invention;

FIG. 4 is a cross sectional view taken along the line IV—IV of FIG. 3; and

FIG. 5 is a schematic elevational view of another embodiment of the lower end portion of the device illustrated in FIG. 3.

Referring now to the drawing and particularly to FIGS. 1 and 2, it will be seen that the apparatus comprises a pair of roller means including rollers 1 and 1' which rollers have substantially horizontal axes and are spaced from each other in a direction transverse to these axes, endless conveyor means include a perforated belt 2 extending about rollers 1 and 1' for transporting a layer 3 of particulate material along an endless path extending about the rollers 1 and 1' and having between the rollers an upper and a lower rung. Chamber means 4 surround at least a portion of the upper rung and have side walls 5 and 5' which will serve at least in part for maintaining layer 3 on belt 2. The perforated belt 2 within its upper rung divides chamber 4 into an upper compartment 6 upwardly of belt 2 and layer 3, and into a lower compartment 7 at the other side, i.e. downwardly of the upper rung of perforated belt 2. Gas inlet means 8 are provided in one of the compartments, preferably in lower compartment 7, and gas outlet means 9 communicate with the other compartment, preferably upper compartment 6, so that gas introduced through gas inlet means 8 into one compartment will pass through the perforated belt and the material thereon to the other compartment to leave the latter through the gas outlet means. Furthermore, tank means 10 are provided partially surrounding the lower rung and including wall means 11 and 11' for maintaining layer 3 on belt 2 in the region of the lower rung, and also for maintaining in tank 10 a liquid bath having a level 12 which is at least up to the lower rung of belt 2.

Walls 13 are provided, preferably integral with the chamber surrounding a portion of the upper rung and the tank surrounding the lower run, for maintaining the layer of particulate material on the belt at the portions thereof which are not surrounded by either the chamber or the tank. The layer 3 is furthermore maintained on belt 2 by a plurality of spaced plates 14 which are fixed to belt 2 and extend in outward direction across substantially the entire width of the belt to a height thus as to nearly contact walls 13 forming stationary guide means for the particulate layer. The particulate layer 3 is thus fully surrounded by walls forming a channel filled with the particulate layer, whereby the inner wall is formed by endless belt 2, with the exception of the portion of the upper rung where the layer passes through chamber 4. While passing through chamber 4, the layer 3 is maintained only by belt 2 and portions of the side walls of chamber 4 whereas during passage through chamber 4 the upper face of the layer remains free.

The thickness of layer 3 and the speed of flow of the gases passing through the layer in chamber 4 and the concentration of impurities which are to be adsorbed from the gas, in other words, the relationship between the concentration of impurities in the untreated gas and the treated gas, must be suitably adjusted relative to each other. Good results are generally achieved in the treatment of industrial waste gases such as flue gases, by utilizing a layer having a thickness of about 50 cm. and a width of between about 5 and 20 meters, which width corresponds to the width of belt 2.

The layer on the belt is, with the exception of the portion thereof passing through chamber 4, practically completely surrounded by the various wall portions so as to pass through a housing formed of the various wall portions and the belt, which housing is substantially completely filled by the particulate material of the layer which, furthermore, is completely cross sected by spaced plates 14. Gas inlet conduit 8, preferably communicates with chamber 4 at a side wall of lower compartment 7 and extends perpendicularly to such side wall. The gas which is thus introduced into the lower compartment 7 of chamber 4 will pass substantially evenly through the moving perforated belt 2 and layer 3 into the upper compartment 6 to be withdrawn or to escape through outlet 9 from where the thus purified gas, without having been substantially cooled by passing through the purification device, may be conveyed to a suitable smoke stack or the like.

Tank 10 is filled with a desorbing liquid up to a level 12 which is at least as high as the lower rung of belt 2, and preferably higher, in order to assure that the entire layer 3 of spent adsorbing material passing through the lower rung will be contacted by the desorbing liquid and thereby regenerated. Due to the fact that there is relatively little difference between the specific gravity of the desorbing liquid and the specific gravity of the adsorbing material, the adsorbing material substantially floats in the liquid layer and thus is subjected to only very little mechanical stress and abrasion.

The desorbing liquid may be introduced through conduit 15 and withdrawn through conduit 15', so that the washing of the spent adsorbing material will be carried out in countercurrent between the adsorbing material and the desorbing liquid.

According to the embodiment illustrated in FIGS. 3 and 4, the gas purification is carried out by means of a downwardly moving layer of particulate adsorbing material. The apparatus comprises first wall means which define an upright inner chamber 21 having an upper end portion 22 and a lower end portion 23. The inner chamber 21 includes a pair of opposite perforated side walls 24 and 24' and, as illustrated, the chamber 21 is filled with downwardly moving particulate material.

Second wall means including walls 25 and 26 define, in combination with the respective perforated walls 24 and 24' two outer chambers 27 and 27' at opposite sides of inner chamber 21.

Gas inlet means including conduit 28 communicating with outer chamber 27 are provided for introduction of gas to be purified into outer chamber 27 so that gas introduced through gas inlet means 28 will pass through outer chamber 27 wherein the gas will be evenly distributed over a large cross section, through inner chamber 21 and the particulate material filling the same, to outer chamber 27' and will leave outer chamber 27' through gas outlet means including conduit 29.

Tank means communicate with the lower end portion 23 of inner chamber 21 and include walls 30 for maintaining in tank 31 a liquid bath.

First conduit means including one or more conduits 33 communicate with tank 31 and lead into the region of upper end portion 22 of inner chamber 21 for the passage of a mixture of particulate material and liquid therethrough and into separating means 34 wherein the mixture will be separated into a liquid portion and into a particulate fraction. These separating means may include, for instance, screen 35. The particulate material separated from the liquid in separating means 34 is then introduced into the upper end portion 22 of inner chamber 21, whereas the separated liquid passes through conduit means which include one or more conduits 36, from the separating means 34 back to tank 31. Conduits 37 serve for introducing fluid, which may be liquid or gas into a tank 31, the bottom of which is formed with an annular internal rim 38 at the outer circumference of which an annular trough 39 is provided. Conduits 33 and 36, respectively communicate with trough 39.

By introducing gas or desorbing liquid under relatively high pressure through conduit 37 into tank 30, inside of rim 38, the particulate material thereabove will be suspended and flushed across rim 38 into trough 39. This, in turn, will cause further downward movement of the superposed portions of the particulate material filling inner chamber 21. By controlling the amount of liquid or gas which is introduced per unit of time through conduit 38, the speed of downward movement of the layer of particulate adsorbing material can be controlled. The downward movement can be further favored by arranging perforated walls 24 and 24' so as to slightly converge upwardly so that the inner cross section of inner chamber 21 at the upper end portion thereof is smaller than at its lower end portion.

The suspended absorbing material which has thus been flushed into annular trough 39 is then carried along upwardly through conduit or conduits 33 by the fluid which has been introduced through conduit 28 until it reaches separating device 34. The upward movement of the suspension is improved by injecting through injectors 40 fresh adsorbing liquid into conduit or conduits 33. A portion of the spent desorbing liquid may be withdrawn through conduit 41, however, the location of conduit 41 need not necessarily be as indicated in the drawing.

For cleaning large volumes of gas per unit of time, the apparatus of the type schematically illustrated in FIGS. 3 and 4 may have a height of between 5 and 20 meters and a width of between 5 and 20 meters, whereas the depth, i.e. the distance of perforated walls 24 and 24' from each other preferably will be maintained between about 0.5 and 1.5 meters. If the width of the apparatus is more than about 7–10 meters, then it is preferred to provide several conduits 33 and 36, respectively and, correspondingly, several openings in the upper end portion of inner chamber 21 and several screens 35 or the like.

FIG. 5 illustrates a somewhat different embodiment with respect to the bottom portion of the apparatus illustrated in FIGS. 3 and 4.

According to FIG. 5, a gas stream is introduced through conduit 51 into the tank 31 so as to contact the still dry pulverulent material moving downwardly from the lower end portion 23 of inner chamber 21. The gas stream will blow the particulate material across rim 38 and onto a screening means 52, preferably a vibrating screen. Dust will pass through the screen and will be withdrawn through funnel 53, whereas the particulate substantially dust-free material will flow from screen 52 into annular trough 39 which in this case is arranged at a somewhat lower level. In annular trough 39, a suspension of particulate material in liquid is formed, as has been described in connection with FIGS. 3 and 4, and this suspension is then passed through conduit 33 and preferably with the help of injector 40, to separating device 34 as previously described.

The following examples are given as illustrative only, without, however, limiting the invention to the specific details of the examples.

EXAMPLE 1

For processing 200,000 standard cubic meters of flue gas containing 1,000 p.p.m. $SO_2$, at a thickness of the adsorbing layer of 1 meter and a contact time between gas and adsorbing layer of 2.5 seconds, a contact area of 200 m.$^2$ is required.

Carrying out this process in an apparatus as illustrated in FIGS. 1 and 2 will require a length of the portion of the upper rung which will be contacted by the gas of 40 meters and a width of 5 meters. Thus, the apparatus will contain 222 tons of adsorption coke which is moving at a speed of 7.2 tons per hour. The term "tons" is meant to denote metric tons. The amount of water introduced per hour will be 8.8 tons and a corresponding amount of 10% sulfuric acid will be continuously withdrawn. The flue gases enter the device at a temperature of 200° C. and will be cooled during passage therethrough to an average temperature of 171° C. The thus purified flue gases will leave the purifying device with a $SO_2$ content of less than 100 p.p.m.

EXAMPLE 2

The same process as described in Example 1 is carried out in an apparatus according to FIGS. 3 and 4, wherein the thickness of the downwardly moving layer is 1 meter, its height 40 meters and its width also 40 meters. The entire apparatus is filled with 120 tons of adsorption coke. 7.5 tons of coke circulate per hour. The desorbing liquid consists of a 0.3% aqueous solution of ammonia and is introduced in an amount of 9.5 tons per hour. At the same rate, ammonium sulfate-containing spent desorption liquid is withdrawn from the apparatus. The purified flue gas leaving the apparatus has an $SO_2$ content of less than 75 p.p.m.

It will be understood that each of the elements described above, or two or more together, may also find a useful application in other types of gas purifying apparatus differing from the types described above.

While the invention has been illustrated and described as embodied in an apparatus for separating adsorbable constituents from a gas containing the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of separating adsorbable constituents from a gas containing the same, comprising the steps of passing said gas in a laterally closed zone of contact through a continuously moving layer extending continuously through said laterally closed zone of contact consisting essentially of a particulate mass of adsorbing material capable of adsorbing said adsorbable constituents, while moving said layer from a first to a second location, said first and second locations substantially limiting said laterally closed zone of contact so as to substantially free said gas of said adsorbable constituents thereof by contact of said gas with said layer while the same moves between said two locations thereby simultaneously charging said moving layer with said adsorbable material; directly introducing the thus charged continuously moving layer in the region and downstream of said second location into a desorption liquid sealing at said second location said laterally closed zone of contact against escape of free gas from said zone of contact and capable of dissolving said adsorbable material and thereby to separate the same from said particulate mass, so as to form a mixture comprising thus desorbed particulate mass and a solution of said adsorbable constituents in said desorption liquid; substantially separating said mixture into separated solution and said continuously moving layer of thus desorbed particulate mass; passing at least said layer of thus desorbed particulate mass to a point in the region of said first location; and reintroducing the thus separated desorbed particulate mass in the region of said first location into said zone of contact for desorbing subsequent portions of said gas during subsequent movement of said layer towards said second location.

2. A method as defined in claim 1, wherein said gas passes through said continuously moving layer in a direction substantially perpendicular to the direction of movement of said continuously moving layer and said continuously moving layer is an endless layer.

3. A method as defined in claim 2, wherein said layer moves from said first to said second location in substantially horizontal direction.

4. A method as defined in claim 2, wherein dust-like particles of said particulate mass are removed therefrom prior to introduction of the same into said desorption liquid.

5. A method as defined in claim 2, wherein said layer moves from said first to said second location in downward direction so as to cause formation of a gas-lock at the point of contact between the downwardly moving layer and the desorption liquid.

6. A method as defined in claim 5, wherein said layer moves from said first to said second location in vertical direction.

7. A method as defined in claim 6, wherein said charged moving layer is introduced into a circulating desorption liquid consisting at least partly of said separated solution, the latter flowing during said introducing in counter current to the introduced charged moving layer and being passed concurrently with the thus introduced particulate mass to said point in the region of said first location.

8. A method as defined in claim 7, wherein during circulation of said circulating desorption liquid a portion thereof consisting of a concentrated solution of said absorbent constituents is withdrawn and replaced with desorption liquid which is substantially free of dissolved adsorbable constituents.

9. A method as defined in claim 1, wherein said gas includes an oxide of sulfur adsorbable by said particulate adsorbing material, and said desorption liquid is an aqueous liquid capable of taking up said sulfur oxide.

10. A method as defined in claim 9, wherein said gas is an industrial waste gas and said aqueous liquid contains ammonia.

11. A method as defined in claim 9, wherein said gas is a flue gas and said aqueous liquid contains ammonia.

12. An apparatus for separating adsorbable constituents from a gas containing the same, said apparatus comprising, in combination, guide means for guiding a continuous layer of particulate adsorbing material through a zone of contact extending from a first location to a second location spaced from said first location; gas conveying means for passing gas containing adsorbable constituents through said layer while the same moves through said laterally closed zone of contact between said first and second location; means including liquid immersion means for maintaining a level of desorption liquid cooperating with said guide means in the region of and downstream of said second location for sealing at said second location said laterally closed zone of contact against escape of free gas from said laterally closed zone of contact and immersing said layer of particulate adsorbing material in said desorption liquid thereby forming a mixture of said adsorbing material of said layer and said desorption liquid and causing dissolution in said desorption liquid of constituents of said gas which had been adsorbed by the particulate adsorbent material of said layer during movement of the latter from said first to said second location; conveying means for passing said mixture from the region of said second location into the region of said first location; separating means associated with said conveying means in the region of said first location for separating thus desorbed particulate adsorbent material from said solution; and introducing means cooperating with said separating means and said guide means for introducing thus separated particulate adsorbing material into said guide means in the region of said first location to serve as subsequent portions of said moving layer.

13. An apparatus as defined in claim 12, and comprising a pair of roller means including rollers having substantially horizontal axes and being spaced from each other in a direction transverse to said axes; endless conveyor means including a perforated belt extending about said rollers for transporting a layer of particulate material along an endless path extending about said rollers and having between said rollers an upper and a lower run; chamber means surrounding at least a portion of said upper run and having side wall means for maintaining said layer on said belt, said perforated belt within said upper run dividing said chamber means into an upper compartment at one side of said perforated belt and the material thereon, and into a lower compartment at the other side of said perforated belt; gas inlet means communicating with one of said compartments and gas outlet means communicating with the other of said compartments so that gas introduced through said gas inlet means into said one compartment will pass through the perforated belt and the material thereon to the other compartment to leave the latter through said gas outlet means; and tank means partially surrounding at least a portion of said lower run and including wall means for maintaining said layer on said belt and for maintaining in said tank means a liquid bath having a level at least up to said lower run of said belt.

14. An apparatus as defined in claim 13, and including a plurality of spaced plates fixed to and extending in outward direction across substantially the entire width of said belt.

15. An apparatus as defined in claim 13, wherein said gas inlet means communicates with said lower compartment and said gas outlet means communicates with said upper compartment of said chamber means.

16. An apparatus as defined in claim 13, and including stationary guide means including walls for maintaining said layer on said belt at the portions of the latter located outside of said chamber and tank means.

17. An apparatus for separating adsorbable constituents from a gas containing the same, said apparatus comprising first wall means defining an upright inner chamber having upper and lower end portions and including a pair of opposite perforated side walls, said inner chamber being adapted to hold a downwardly moving layer of particulate material; second wall means defining with the respective perforated side walls two outer chambers at opposite sides of said inner chamber; gas inlet means communicating with one of said outer chambers, and gas outlet means communicating with the other of said outer chambers so that gas introduced through said gas inlet means into one of said outer chambers will pass through said inner chamber and the particulate material therein to the other of said outer chambers to leave the latter through said gas outlet means; holding means communicating with the lower end portion of said inner chamber and including wall means for maintaining in said holding means a liquid bath; first conduit means for passing a mixture of particulate material and liquid formed in said holding means from the latter into the region of said upper end portion of said inner chamber; separating means operatively connected to said first conduit means for separating said mixture into liquid and particulate material and for introducing the thus separated particulate material into the upper end portion of said inner chamber.

18. An apparatus as defined in claim 17, and including fluid inlet means communicating with said tank means for introducing fluid into the same for contact with particulate material introduced into said tank means through the lower end portion of said inner chamber.

19. An apparatus as defined in claim 17, and including liquid injection means communicating with said first conduit means for injecting liquid into the same.

20. An apparatus as defined in claim 17, wherein each of said first and second conduit means, respectively, comprises a plurality of conduits.

21. An apparatus as defined in claim 17, and including outlet means communicating with said tank means for maintaining a predetermined level of liquid therein.

22. An apparatus as defined in claim 17, and including vibrating screening means arranged in said tank means above the level of said liquid bath, for separating dust from the particulate material introduced into said tank means through said lower end portion of said inner chamber, and for introducing the thus substantially dust free particulate material into said liquid.

23. An apparatus as defined in claim 17, wherein said holding means is a tank means and said separating means is operatively connected to said first conduit means in the region of said upper end portion of said inner chamber, and including second conduit means communicating with said separating means and said tank means for conveying separated liquid from said separating means to said tank means.

References Cited

UNITED STATES PATENTS

| | | | |
|---|---|---|---|
| 1,420,209 | 6/1922 | Paulus | 23—262 |
| 2,198,745 | 4/1940 | Smith | 23—2.1 |
| 2,222,828 | 11/1940 | Guthrie | 55—390 |
| 2,534,859 | 12/1950 | Evans | 232—418 |
| 2,925,928 | 2/1960 | Martin | 55—77 |
| 2,992,065 | 7/1961 | Feustel et al. | 23—2.1 |
| 3,024,082 | 3/1962 | Colton | 23—262 |
| 3,294,487 | 12/1966 | Pauling | 23—178 |

REUBEN FRIEDMAN, *Primary Examiner.*

C. N. HART, *Assistant Examiner.*